United States Patent Office 3,536,479
Patented Oct. 27, 1970

3,536,479
METHOD FOR THE PRODUCTION OF HIGH PURITY OSMIUM
Alexander Illis, Clarkson, Ontario, and Alan Manson, Oakville, Ontario, Canada, assignors to The International Nickel Company, Inc., New York, N.Y., a corporation of Delaware
No Drawing. Filed Dec. 13, 1967, Ser. No. 690,083
Claims priority, application Canada, Feb. 21, 1967, 983,421
Int. Cl. C22b 7/00, 11/04
U.S. Cl. 75—108   29 Claims

ABSTRACT OF THE DISCLOSURE

Metallic osmium is recovered from a slurry of an osmium-containing material to which sufficient hydrochloric acid has been added to assure a final pH value in the slurry of about 1 to 9 by heating the slurry to a temperature of at least about 150° F. under a hydrogen pressure of at least about 15 p.s.i.g.

---

The present invention relates to the recovery of osmium, and more particularly to recovery and purification of osmium by hydrometallurgical techniques.

It was long suspected that the nickel-containing complex sulfide ore deposits of the Sudbury district of Ontario, Canada, contained osmium but the presence of osmium in recoverable amounts was only confirmed recently when it was determined that most of the osmium was lost during treatment of the slimes resulting from the electrorefining of nickel. U.S. patent application Ser. No. 506,899 filed on Nov. 8, 1965, now Pat. No. 3,413,114, discloses that osmium-bearing materials such as secondary nickel anode slimes can be treated to concentrate the precious metal content without undue losses of osmium being encountered by treating the anode slimes with sulfuric acid at temperatures below about 500° F. to sulfate the base metals such as copper and nickel and removing the sulfated base metals by leaching. The residue containing osmium is then treated to oxidize and volatilize osmium as osmium tetroxide which is collected in an alkaline solution such as sodium hydroxide to form a dilute osmium-containing solution. The dilute osmium-containing solution is then treated to form a more concentrated solution of sodium osmate from which osmium is then recovered. Treatement of the dilute alkaline solution to ultimately recover osmium required a number of carefully controlled operations and often involved intermediate products which presented materials-handling problems.

It has now been discovered that purified metallic osmium sponge can be recovered from concentrated osmium-containing solutions in an economic manner and that dilute solutions of osmium can be treated to form concentrated osmium-containing solutions from which metallic osmium sponge of high purity can be precipitated.

It is an object of the present invention to precipitate metallic osmium sponge from concentrated osmium-containing solutions.

It is a further object of the present invention to produce concentrated and purified osmium-containing solutions from which metallic osmium sponge can be precipitated.

Broadly stated, the present invention contemplates a process for precipitating osmium from an aqueous solution by forming a concentrated osmium-containing slurry which contains sufficient hydrochloric acid to give a final pH value between about 1 and 9 after precipitation and then precipitating metallic osmium sponge by heating the slurry to a temperature of at least about 150° F. under a hydrogen pressure of at least about 15 pounds per square inch gauge (p.s.i.g.).

The concentrated osmium-containing solution can advantageously be prepared from a dilute osmium-containing solution as described hereinafter. However, most generally the concentrated solution will be prepared by scrubbing gases containing osmium tetroxide with a solution containing, by weight, about 5% to 40% sodium hydroxide to produce a sodium perosmate solution which contains about 5 grams per liter (g.p.l.) to about 100 g.p.l. of osmium, e.g., about 60 g.p.l. of osmium. Generally at this stage only minor amounts of ruthenium, i.e., less than about 0.5 g.p.l. of ruthenium, accompany the osmium and can be precipitated with only minor amounts of osmium occluded therein from the concentrated osmium-containing solution by adding a water-soluble, mild organic reducing agent such as methyl alcohol and ethyl alcohol. The mild organic reducing agent also reduces the sodium perosmate in solution to the sodium osmate state which is highly advantageous since sodium perosmate solutions display substantial vapor pressures even at room temperature whereas sodium osmate solutions at room temperature display only negligible vapor pressures. In order to precipitate ruthenium and to reduce sodium perosmate to sodium osmate, the mild organic reducing agent is added to the concentrated osmium-containing solution at least in amounts effective to reduce sodium perosmate to sodium osmate and to precipitate ruthenium, e.g., about 1% to about 10% by volume of the alkaline solution and advantageously about 4% to about 6%. Advantageously, the volatilized osmium tetroxide is collected in an alkaline scrubbing solution containing the water soluble, mild organic reducing agent to increase the scrubbing efficiency and to precipitate ruthenium.

Metallic osmium sponge is precipitated from solution by adding sufficient hydrochloric acid to the solution to provide after precipitation a final pH value of about 1 to 9. The hydrochloric acid addition is required to neutralize excess alkali and the control of the final pH is important since at pH values below about 1 precipitation is incomplete and the osmium sponge is likely to be contaminated as a result of corrosion of the apparatus and at pH values above about 9 precipitation is also incomplete. Advantageously, the hydrochloric acid addition is controlled so that after precipitation the final pH value is between about 4 and 7. Substantial precipitation of osmium occurs upon addition of the hyrochloric acid to the concentrated solution resulting in a slurry. Although the hydrochloric acid can be added directly to the concentrated sodium osmate solution, such direct additions are not always accurate and there is a distinct possibility of osmium losses due to volatilization of osmium tetroxide. Therefore, it is highly advantageous to treat the concentrated sodium osmate solution to produce an osmium-containing material to which accurate hydrochloric acid additions can be made without encountering losses of osmium through volatilization. Such an osmium-containing material can be produced by the intermediate step of adding an excess of a potassium hydroxide solution, advantageously as a saturated solution of potassium hydroxide, to the concentrated sodium osmate solution to precipitate violet crystals of potassium osmate, $$K_2OsO_4 \cdot 2H_2O$$

After separation, washing with alcohol and water and then with pure alcohol and drying, the violet crystals of potassium osmate can be slurried with cold water and easily determined stoichiometric amounts of hydrochloric acid are added to provide a slurry which can readily be treated with hydrogen at elevated temperatures and pressures to precipitate metallic osmium sponge. Regardless of whether hydrochloric acid additions are made directly to the concentrated sodium osmate solution or to a slurry of precipitated potassium osmate crystals, metallic osmium sponge is precipitated from the resulting osmium-containing solution by heating the solution to a temperature of at least about 150° F., e.g., about 200° F. to 350° F. and at a hydrogen partial pressure of at least about 15 p.s.i.g., e.g., advantageously about 300 p.s.i.g. to 700 p.s.i.g.

Metallic osmium sponge precipitated from solution by hydrogen reduction contains substantial quantities of adsorbed hydrogen and trace amounts of other impurities and can be purified by washing the osmium sponge with an aqueous solution of hydrochloric acid at a temperature below about 100° F., e.g. at room temperature. Impurities such as iron, nickel and chromium react with the aqueous solution of hydrochloric acid to form soluble chlorides which are removed from the osmium sponge while adsorbed hydrogen is concomitantly released. The aqueous solution of hydrochloric acid advantageously has a normality of about 0.5 to 5.

Another advantageous embodiment of the present invention is to heat osmium sponge purified in accordance with the present invention to a temperature of at least about 1500° F. in a reducing atmosphere containing hydrogen. Reducing atmospheres containing up to about 100% hydrogen can be employed. However, reducing atmospheres containing hydrogen in amounts as low as about 3%, by volume, or lower and the balance essentially nitrogen are advantageously employed. Such heating renders the normally pyrophoric osmium sponge non-pyrophoric.

Dilute osmium-containing solutions can be formed by collecting osmium tetroxide, which is volatilized from an osmium-containing material by heating to elevated temperatures in a free oxygen-containing gas such as air, either in an aqueous solution containing a mild reducing agent such as an aqueous solution saturated with sulfur dioxide or selenium dioxide either in a solution of about 5% to about 40% sodium hydroxide by weight. An osmium containing precipitate is then precipitated from the dilute osmium-containing solution by passing therethrough a reducing gas such as sulfur dioxide and/or hydrogen sulfide at a temperature of about 70° F. to about 180° F. After separation from the solution the osmium-containing precipitate is slurried with water at about 2% to about 20% solids, by weight, and is then treated with an oxidizing agent at elevated temperatures to form osmium tetroxide which is collected in a solution of about 5% to about 40%, by weight, sodium hydroxide to form a concentrated, purified solution of sodium perosmate. All osmium-containing materials can be treated in the aforedescribed manner to produce a concentrated solution of sodium perosmate. However, when the original osmium-containing material contains substantial quantities of sulfur and selenium it is advantageous in terms of cost of reagents and continuity of operation to precipitate an osmium-containing precipitate by passing sulfur dioxide at a temperature of about 70° F. to about 120° F. through the dilute osmium-containing solution. Sufficient sulfur dioxide is passed through the dilute sodium perosmate solution to end up with a solution having a pH value of about 6 to 8, e.g., about 7. Advantageously, most of the excess alkali can be neutralized by the addition of sulfuric acid to a pH of between 8 and 10 and completing neutralization by the addition of sulfur dioxide gas to precipitate an osmium-containing material. The osmium-containing precipitate is separated from the solution and is then pulped at about 2% to 20% solids, by weight, with an aqueous solution containing from about 10% to about 40% sulfuric acid, by weight of the water. The resulting pulp is then heated to the boiling point while passing air therethrough to volatilize sulfur dioxide and any carbon-containing gases such as carbon dioxide. When the evolution of gases such as sulfur dioxide subsides or ceases, an oxidizing reagent such as sodium chlorate, sodium bromate or nitric acid in amounts equivalent to sodium chlorate additions from about 1% to about 10%, by weight of the pulp, is added to the pulp. Heating is then continued to volatilize osmium tetroxide which is collected in a solution of about 5% to about 40% sodium hydroxide, by weight, to form a purified concentrated sodium perosmate solution.

In carrying the invention into practice, it is preferred to gradually heat an osmium-containing material which can also contain sulfur, selenium and ruthenium to a temperature of from about 1200° F. to about 2000° F. at a rate of about 50° F. to 100° F. per hour in a free oxygen-containing atmosphere to volatilize osmium as osmium tetroxide. Gradual heating is necessary to avoid fusion of the osmium-containing material before osmium is volatilized therefrom. The osmium tetroxide along with sulfur, selenium and dust is collected in an aqueous sodium hydroxide solution to form a dilute osmium-containing solution. The aqueous sodium hydroxide solution advantageously contains between about 5% and 40% sodium hydroxide by weight. An osmium-containing precipitate is recovered from the solution without separation of the solids from the collecting solution since the solids contain osmium by bubbling therethrough sulfur dioxide while maintaining the solution at a temperature of from about 70° F. to about 120° F. The osmium-containing precipitate is separated from the solution and is then slurried with water to form a slurry with about 2% to about 20%, by weight, solids. Sulfuric acid in amounts of about 10% to about 40%, by weight, of the water, is added to the slurry. The slurry of the osmium-containing precipitate and sulfuric acid is then heated to the boiling point while bubbling air therethrough to volatilize sulfur as sulfur dioxide. After evolution of sulfur dioxide from the slurry ceases, an oxidizing reagent such as sodium chlorate, sodium bromate and nitric acid is added to the slurry and heating is continued to volatilize osmium tetroxide from the slurry. Volatilized osmium tetroxide is collected in an aqueous solution containing about 5% to about 40%, by weight, sodium hydroxide to form a concentrated aqueous solution of sodium perosmate. At this stage of the process little or no ruthenium, if originally present in the osmium-containing material, accompanies the osmium. However, if the concentrated sodium perosmate solution does contain ruthenium, the concentrated sodium perosmate solution is treated with a water soluble mild organic reducing agent such as ethyl alcohol and methyl alcohol to precipitate ruthenium with small amounts of osmium occluded therein and to reduce sodium perosmate to sodium osmate. Any precipitated ruthenium is then separated from the sodium osmate solution. Hydrochloric acid is then added to the concentrated sodium osmate solution in amounts effective to neutralize excess alkali and the resulting solution is then treated with hydrogen at pressures of from about 300 p.s.i.g. to about 700 p.s.i.g. and at elevated temperatures of from about 200° F. to about 350° F. to precipitate osmium sponge. A more dense form of osmium sponge can be obtained by precipitating osmium at temperatures in excess of about 250° F. Densification of the osmium sponge can also be obtained by recycling at least a portion of previously precipitated osmium sponge. Advantageously, the concentrated sodium osmate solution can be treated with potassium hydroxide to precipitate hydrated crystalline potassium osmate which is readily filterable. The hydrated potassium osmate is separated from the aqueous phase and is then washed with alcohol and water and then pure alcohol to obtain a relatively stable salt of known composition. After washing and drying at room temperature, the hydrated potassium osmate is slurried with water to form a slurry containing about 2% to about 20% solids, by weight. Hydrochloric acid is then added to the slurry at least in amounts equivalent to the potassium in the potassium osmate salt. Osmium sponge is then precipitated from solution by hydrogen as described hereinbefore for precipitating osmium sponge from a concentrated sodium osmate solution to which hydrochloric acid has been added.

Osmium spong precipitated from either of the before-described processes is then treated with an aqueous hydrochloric acid solution having a normality of about 0.5 to 5 at temperature below about 100° F., e.g., about 60° F. to about 80° F., to purify the osmium by removing therefrom hydrogen and traces of iron, nickel and chromium. The purified osmium sponge is washed with water and dried in a hydrogen atmosphere at a temperature of about 200° F. to about 220° F. If it is preferred to render the osmium sponge non-pyrophoric, the dried sponge is heated to a temperature of at least about 1500° F. in a reducing atmosphere containing hydrogen.

For the purpose of giving those skilled in the art a better understanding of the invention and/or a better appreciation of the advantages of the invention, the following illustrative examples are given:

EXAMPLE I

A precious metals concentrate weighing 133 kilograms (kg.) and containing 10.93 troy ounces of osmium was heated in a furnace under oxidizing conditions for 24 hours at gradually increasing temperatures up to 1700° F. The furnace off-gases were passed through a 10% solution of sodium hydroxide to recover the osmium as sodium osmate contaminated with sulfur, selenium, dust, etc. The alkaline osmium solution was treated with sulfur dioxide gas to pH 7.0 and at room temperature to precipitate a crude osmium concentrate. The solids were recovered by filtration and contained 10.7 troy ounces of osmium. The filtrate was found to be virtually osmium free. The calcined solids were sampled and analyzed for osmium content. The results of the test are summarized as follows:

|  | Weight | | Osmium | | |
| --- | --- | --- | --- | --- | --- |
|  | Kg. | Percent | Percent | Tr., Oz. | Dist., percent |
| Head sample | 133 | 100 | 9.25 | 10.93 | 100 |
| Calcined residue | 106 | 80.0 | 0.005 | 0.175 | 1.6 |
| Osmium concentrate | 8.77 | 6.44 | 3.8 | 10.70 | 98.0 |
| Barren solution |  |  |  | 0.05 | 0.4 |

Crude osmium concentrate was treated in lots of one kilogram each for recovery of osmium according to the following method:

The wet solids were blended to a smooth pulp in three liters of water using a high speed mixer to break down any lumps. The slurry was transferred to a twelve liter, three neck distillation flask with another two liters of water. Three liters of 12 N sulphuric acid solution were then added and the flask fitted with an air inlet tube, a reagent addition flask and a condenser. Heat was applied and a current of air was pulled through the slurry for about 30 minutes by means of a vacuum system to remove any free sulfur dioxide or carbon dioxide. The condenser outlet was then connected to three absorbers in series, the first containing about 200 ml. of 20% by weight sodium hydroxide and the others about 100 ml. each at the same concentration. About 400 ml. of 20% sodium chlorate solution was added to the boiling slurry over about a 20-minute period to oxidize the osmium to the volatile tetroxide which was caught in the alkaline scrubbers as sodium perosmate. The distillation was continued for about 90 minutes to recover the maximum amount of the osmium, about 25 ml. of the sodium chlorate solution being added every 15 minutes. Analysis of the distillation residue and sodium perosmate solutions showed the osmium distribution to be as follows:

|  | Osmium, grams | Distribution, percent |
| --- | --- | --- |
| Head sample | 38 | 100 |
| Sodium perosmate solution | 37.5 | 98.7 |
| Distillation solids | 0.1 | 0.3 |
| Distillation solutions | 0.4 | 1.0 |

The brown sodium perosmate solutions from five such distillations, containing 6.0 troy ounces of osmium were combined and treated with 5 ml. of ethyl alcohol to precipitate any ruthenium present and to convert the perosmate to the osmate. The ruthenium precipitate which included a small amount of occluded osmium was removed by filtration and reserved for further treatment. The filtrate was transferred to a plastic beaker and about an equal volume of saturated potassium hydroxide solution was added to precipitate violet crystals of potassium osmate.

The salt was allowed to settle, the supernatant liquor decanted and replaced with a mixture of equal parts ethanol and water followed by stirring and settling. The supernatant liquor was again removed and the washing repeated three more times. Finally, the salt was transferred to a Number 50 whatman filter paper, washed again with the alcohol-water mixture and finally with pure alcohol. The salt was allowed to dry at room temperature overnight. The weight of dry salt, analyzing 51.6% osmium, obtained was 350 g. or 96.3% of the osmium originally present in the sodium perosmate solution. The decants and washings which contained 3.7% of the osmium were treated separately for recovery of this element.

Approximately 100 g. of the dry potassium osmate was stirred into 950 ml. of distiled water and 44 ml. of 12 N hydrochloric acid was added. The mixture was charged into a titanium metal pressure apparatus. Hydrogen gas was passed through the apparatus at room temperature to displace any air and then heat was applied until a temperature of 240° F. was reached. Hydrogen was then bubbled into the slurry to a presure of 500 p.s.i.g. and agitation was applied for one hour. After cooling, the apparatus was flushed with nitrogen to displace the hydrogen and the contents were emptied into a beaker. The supernatant solution having a pH value of 6 was decanted and replaced with 1 N hydrochloric acid. When all the adsorbed hydrogen was released, the solids were allowed to settle and the solution was decanted. The solids were washed with about ten displacements of distilled water until virtually chloride free, and then filtered. The moist osmium sponge was packed into a clean porcelain boat and dried overnight in a tube furnace at about 200° F. while a hydrogen-containing gas was continually pased through the tube. The next day the temperature of the furnace was gradually raised to 1700° F. and maintained there for one hour. The tube was removed from the furnace, its contents cooled to room temperature, and the hydrogen was displaced with a stream of nitrogen. The sintered solids, weighing 50 g., were ground to a fine powder and analyzed 99.98% pure.

EXAMPLE II

As an alternative to the production of making the potassium osmate salt in accordance with Example I, the ruthenium-free osmate solution of Example I was reduced to sponge osmium directly. The ruthenium-free solution, containing 60 g. of osmium, was treated with concentrated hydrochloric acid to pH 7.0. The mixture was charged into a titanium metal pressure apparatus and the system was flushed with hydrogen gas. The temperature was raised to 250° F. and hydrogen was introduced to a pressure of 350 p.s.i.g. for one hour with agitation. The final pH value of the solution was 8. The apparatus was then cooled, flushed with nitrogen and the osmium sponge produced was treated as in Example I to give a final product weighing 58 grams and analyzing 99.97% osmium.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for recovering metallic osmium which comprises forming a basic concentrated osmium-containing slurry, adding sufficient hydrochloric acid to give a final pH value between about 1 and 9 after precipitation of metallic osmium, then precipitating metallic osmium by heating the solution to a temperature of at least about 150° F. under a hydrogen pressure of at least about 15 p.s.i.g. and recovering said metallic osmium.

2. A process as described in claim 1 wherein metallic osmium is precepitated at a temperature from about 200° F. to 350° F. under a hydrogen pressure of about 300 p.s.i.g. to 700 p.s.i.g.

3. A process as described in claim 1 wherein the precipitated metallic osmium is washed with an aqueous solution of hydrochloric acid at a temperature below about 100° F. to remove trace impurities and to free the metallic osmium of adsorbed hydrogen.

4. A process as described in claim 1 wherein the washed metallic osmium is dried and is then heated to a temperature above about 1500° F. in a reducing atmosphere containing hydrogen to render the metallic osmium non-pyrophoric.

5. A process as described in claim 1 wherein a denser form of metallic osmium is obtained by precipitating metallic osmium at temperatures in excess of about 250° F.

6. A process as described in claim 1 wherein a more dense form of metallic osmium is obtained by recycling at least a portion of previously precepitated osmium sponge.

7. A process for precipitating metallic osmium from a concentrated sodium osmate solution which comprises adding hydrochloric acid to the concentrated sodium osmate solution in an amount effective to give a final pH value between about 1 and 9 after precipitation, precipitating metallic osmium by heating the solution to a temperature of at least about 150° F. under a hydrogen pressure of at least about 15 p.s.i.g. and recovering said metallic osmium.

8. A process for recovering osmium from a concentrated sodium osmate solution by precipitating metallic osmium from an aqueous solution which comprises adding sufficient potassium hydroxide to the concentrated sodium osmate solution to precipitate hydrated potassium osmate, forming a slurry of the precipitated potassium osmate and water, adding hydrochloric acid to the slurry in an amount effective to give a final pH value between about 1 and 9 after precipitation of metallic osmium, precipitating metallic osmium by heating the slurry to a temperature of at least about 150° F. under a hydrogen pressure of at least about 15 p.s.i.g. and recovering said metallic osmium.

9. A process for recovering osmium from hydrated potassium osmate which comprises forming a slurry of potassium osmate and water, adding hydrochloric acid to the slurry in an amount effective to give a final pH value between about 1 and 9 after precipitation of metallic osmium, precipitating metallic osmium by heating the solution to a temperature of at least about 150° F. under a hydrogen pressure of at least about 15 p.s.i.g. and recovering said metallic osmium.

10. A process for recovering osmium from an osmium-containing material which comprises gradually heating the osmium-containing material to a temperature from about 1200° F. to 2000° F. in a free oxygen-containing gas to volatilize osmium tetroxide, collecting the volatilized osmium tetroxide in an aqueous solution selected from the group consisting of sodium hydroxide solutions, saturated sulfur dioxide solutions and saturated selenium dioxide solutions to form a dilute osmium-containing solution, precipitating an osmium-containing precipitate by passing a reducing gas through the dilute osmium-containing solution, forming a slurry of the osmium-containing precipitate with aqueous sulfuric acid, voltalizing osmium tetroxide from the slurry by adding to the slurry an oxidizing reagent and by heating the slurry to the boiling point, collecting the volatilized osmium tetroxide in a sodium hydroxide solution to form a concentrated sodium perosmate solution, adding a mild organic reducing agent to the concentrated sodium perosmate solution to reduce sodium perosmate to sodium osmate, adding hydrochloric acid in an amount effective to give a final pH value between about 1 and 9 after precipitation of metallic osmium, precipitating metallic osmium by heating the solution to a temperature of at least about 150° F. under a hydrogen pressure of at least about 15 p.s.i.g. and recovering said metallic osmium.

11. A process for recovering osmium from an osmium-containing material which comprises gradually heating the osmium-containing material to a temperature from about 1200° F. to 2000° F. in a free oxygen-containing gas to voltatilize osmium tetroxide, collecting the volatilized osmium tetroxide in a sodium hydroxide solution to form a dilute osmium-containing solution, precipitating an osmium-containing precipitate by passing a reducing gas through the dilute osmium-containing solution, forming a slurry of the osmium-containing precipitate with water, volatilizing osmium tetroxide from the slurry by adding to the slurry an oxidizing reagent and by heating the slurry to the boiling point, collecting the volatilized osmium tetroxide in a sodium hydroxide solution to form a concentrated sodium perosmate solution, adding a mild organic reducing agent to the concentrated sodium perosmate solution to reduce sodium perosmate to sodium osmate, precipitating hydrated potassium osmate from the concentrated sodium osmate solution by adding thereto an excess of potassium hydroxide, forming a slurry of the precipitated potassium osmate in water, adding hydrochloric acid to the slurry in an amount effective to give a final pH value between about 1 and 9 after precipitation of metallic osmium, precipitating metallic osmium by heating the solution to a temperature of at least about 150° F. under a hydrogen pressure of at least about 15 p.s.i.g. and recovering said metallic osmium.

12. A process for recovering osmium from an osmium-containing material which can contain sulfur and ruthenium which comprises gradually heating the osmium-containing material to a temperature from about 1200° F. to 2000° F. in a free oxygen-containing atmosphere to volatilize osmium tetroxide, collecting the osmium tetroxide in an aqueous solution of sodium hydroxide to form a dilute osmium-containing solution, passing sulfur dioxide through the dilute osmium-containing solution to form an osmium-containing precipitate, forming a slurry of the osmium-containing precipitate with water and sulfuric acid, heating said slurry while passing air therethrough to volatilize any sulfur in the osmium-containing precipitate as sulfur dioxide, adding an oxidizing reagent to the slurry after evolution of sulfur dioxide ceases to volatilize osmium tetroxide, collecting the osmium tetroxide in an aqueous solution of sodium hydroxide to form a concentrated solution of sodium perosmate, adding a mild organic reducing agent to the concentrated perosmate solution to precipitate any ruthenium and to reduce sodium perosmate to sodium osmate, adding hydrochloric acid to the concentrated sodium osmate solution in an amount effective to give a final pH value between about 1 and 9 after precipitation of metallic osmium, precipitating metallic osmium by heating the solution to a temperature of at least about 150° F. under a hydrogen pressure of at least about 15 p.s.i.g. and recovering said metallic osmium.

13. A process as described in claim 12 wherein metallic osmium is precipitated at a temperature from about 200° F. to 350° F. under a hydrogen pressure of about 300 p.s.i.g. to 700 p.s.i.g.

14. A process as described in claim 12 wherein the volatilized osmium tetroxide is collected in a sodium hydroxide solution to which the mild organic reducing agent has been added to form a concentrated sodium osmate solution.

15. A process as described in claim 12 wherein the osmium-containing material is heated to a temperature from about 1200° F. to about 2000° F. at a rate effective to avoid fusion of the osmium-containing material.

16. A process as described in claim 12 wherein the osmium-containing material is heated to a temperature from about 1200° F. to 2000° F. at a rate of about 50° F. per hour to 100° F. per hour.

17. A process as described in claim 12 wherein the precipitated metallic osmium is washed with an aqueous solution of hydrochloric acid at a temperature below about 100 F. to remove trace impurities and to free the metallic osmium of adsorbed hydrogen.

18. A process as described in claim 17 wherein the washed metallic osmium is dried and is then heated to a temperature of at least about 1500° F. in a reducing atmosphere containing hydrogen to render the metallic osmium non-pyrophoric.

19. A process as described in claim 12 wherein a more dense form of metallic osmium is obtained by precipitating metallic osmium at temperatures in excess of about 250° F.

20. A process as described in claim 12 wherein a more dense form of metallic osmium is obtained by recycling previously precipitated osmium sponge.

21. A process for recovering osmium from an osmium-containing material which can contain sulfur and ruthenium which comprises heating the osmium-containing material to a temperature of about 1200° F. to about 2000° F. in a free oxygen-containing atmosphere to volatilize osmium tetroxide, collecting the osmium tetroxide in an aqueous solution of sodium hydroxide to form a dilute osmium-containing solution, passing sulfur dioxide through the dilute osmium-containing solution to form an osmium-containing precipitate, forming a slurry of the osmium-containing precipitate with water and sulfuric acid, heating said slurry while passing air therethrough to volatilize any sulfur in the osmium-containing precipitate as sulfur dioxide, adding an oxidizing reagent to the slurry after evoluton of sulfur dioxide ceases to volatilize osmium tetroxide, collecting the osmium tetroxide in an aqueous solution of sodium hydroxide to form a concentrated solution of sodium perosmate, adding a mild organic reducing agent to the concentrated perosmate solution to precipitate any ruthenium and to reduce sodium perosmate to sodium osmate, precipitating hydrated potassium osmate from the concentrated sodium osmate solution by adding thereto an excess of potassium hydroxide, forming a slurry of the precipitated potassium osmate in water, adding hydrochloric acid to the slurry in an amount effective to give a final pH value between about 1 and 9 after precipitation of metallic osmium, precipitating metallic osmium by heating the solution to a temperature from about 200° F. to 350° F. under a hydrogen pressure of about 300 p.s.i.g. to 700 p.s.i.g. and recovering said metallic osmium.

22. A process as described in claim 21 wherein the osmium-containing material is heated to a temperature of about 1200° F. to about 2000° F. at a rate effective to avoid fusion of the osmium-containing material.

23. A process as described in claim 21 wherein the osmium-containing material is heated to a temperature from about 1200° F. to 2000° F. at a rate of about 50° F. per hour to 100° F. per hour.

24. A process as described in claim 21 wherein sulfur dioxide is passed through the dilute osmium-containing solution until the pH value of the solution is about 6 to 8.

25. A process as described in claim 21 wherein sulfuric acid is added to the dilute osmium-containing solution in amounts effective to give a pH value between about 8 and 10 before passing sulfur dioxide through the dilute osmium-containing solution.

26. A process as described in claim 21 wherein the precipitated metallic osmium is washed with an aqueous solution of hydrochloric acid and an oxidizing agent at a temperature below about 100 F. to remove trace impurities and to free the metallic osmium of adsorbed hydrogen.

27. A process as described in claim 21 wherein the washed metallic osmium is dried and is then heated to a temperature of at least about 1500° F. in a reducing atmosphere containing hydrogen to render the metallic osmium non-pyrophoric.

28. A process as described in claim 21 wherein a more dense form of metallic osmium is obtained by precipitating metallic osmium at temperatures in excess of about 250° F.

29. A process as described in claim 21 wherein a more dense form of metallic osmium is obtained by recycling previously precipitated osmium sponge.

References Cited

UNITED STATES PATENTS

| | | | |
|---|---|---|---|
| 2,044,366 | 6/1936 | Pierson | 75—108 |
| 2,371,119 | 3/1945 | Nachod | 75—108 |
| 3,150,960 | 9/1964 | Hunter | 75—108 X |
| 3,238,038 | 3/1966 | Hunter | 75—108 X |
| 3,390,981 | 7/1968 | Hoffman | 75—108 |
| 3,413,114 | 11/1968 | Illis et al. | 75—83 X |

OTHER REFERENCES

Thorpe's Dictionary of Applied Chemistry; vol. IX; 4th ed., Longmans, Green and Co., London, 1949, pp. 133, 134.

HENRY W. TARRING II, Primary Examiner

U.S. Cl. X.R.

75—83, 99, 114, 116, 121